(No Model.)
G. E. DUPEE.
DEVICE FOR MEASURING THE THICKNESS OF LUMBER.
No. 387,284.  Patented Aug. 7, 1888.
Fig. 1.
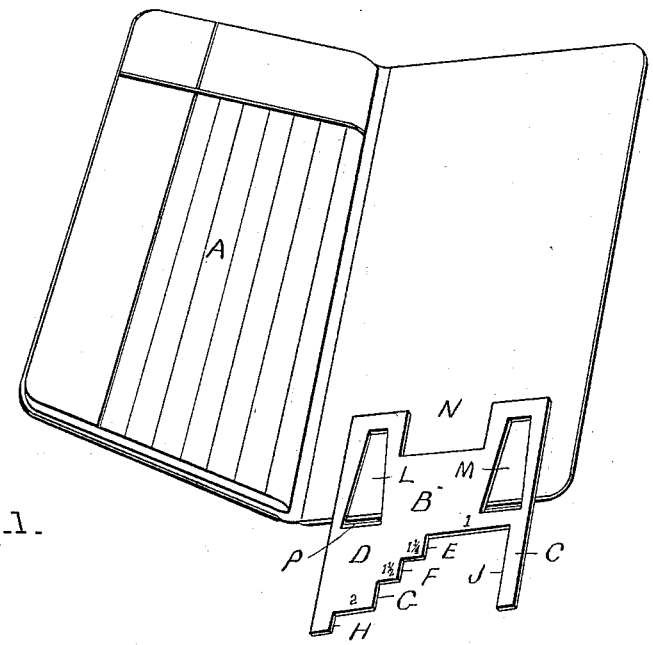
Fig. 3.
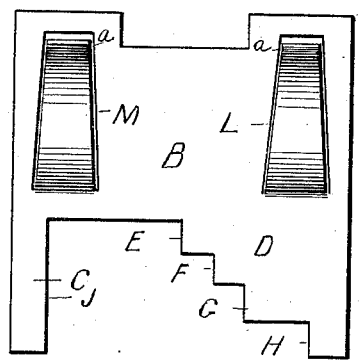
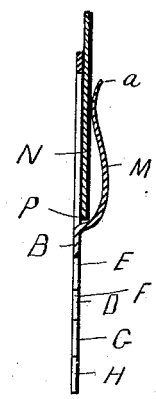
Fig. 2.
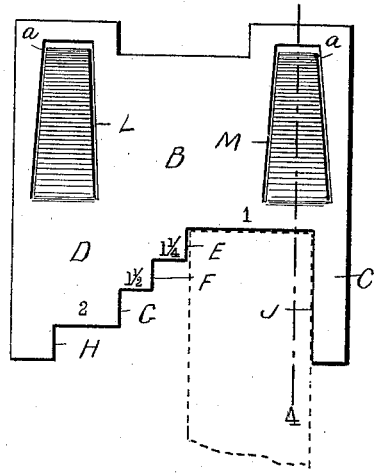
Fig. 4.
WITNESSES.
Percy Bryant.
C. E. Nichols.
INVENTOR.
George E. Dupee.
per Edwin W. Brown.
Attorney.
N. PETERS, Photo-Lithographer, Washington, D. C.

ved with means for its convenient and ready

UNITED STATES PATENT OFFICE.

GEORGE E. DUPEE, OF BOSTON, MASSACHUSETTS.

DEVICE FOR MEASURING THE THICKNESS OF LUMBER.

SPECIFICATION forming part of Letters Patent No. 387,284, dated August 7, 1888.

Application filed November 7, 1887. Serial No. 254,535. (No model.)

*To all whom it may concern:*

Be it known that I, GEORGE E. DUPEE, of Boston, in the county of Suffolk and State of Massachusetts, have invented certain new and useful Improvements in a Device for Measuring Thickness of Lumber, &c., of which the following is a full, clear, and exact description.

This invention consists of a device for measuring thicknesses of boards, lumber, &c., provided with means for its convenient and ready attachment to and detachment from the cover of a book, &c., or any other suitable and desirable article, all substantially as hereinafter fully described, reference being had to the accompanying plate of drawings, in which—

Figure 1 is a perspective view of a book open, having the measuring device attached to the cover of the book in accordance with this invention; Figs. 2 and 3, respectively front and back views of the measuring device detached from the book; and Fig. 4 is a vertical section on line 4 4, Fig. 2, showing also the cover of the book in cross-section, Figs. 2, 3, and 4 being enlarged.

In the drawings, A represents a memorandum-book of any suitable construction; and B, the measuring device attached to the back cover of the book, as shown in Fig. 1. This measuring device B is made, preferably, of sheet metal and of the desired size and shape, substantially as shown in the drawings, in any suitable manner, having an arm or guide, C, on one side, and an arm, D, opposite thereto, notched or cut away at intervals, as shown at E F G H, for the distances between such edges and the edge J of the arm C to be respectively one inch, one inch and one-quarter of an inch, one inch and one-half of an inch, and two inches, all as shown in Figs. 1 and 2 more particularly.

In the use of the measure, the board, &c., to be measured as to its thickness is placed at its edge between the edge J of the arm C, the edge J bearing against one side of the board, as shown in dotted lines in Fig. 2, and its thickness ascertained by whichever notch or shoulder will lay over or abut against the edge of the board, all as is well known in such measures.

On the plate of the measuring device are two flat springs, L and M, integral with the plate, the end *a* of each of which projects a slight distance from the plate, as shown in Fig. 4 more particularly, which springs are for the purpose of securing and holding it to the book-cover N, &c., and in attaching it to the cover the edge P of the cover is inserted between the springs L M and the plate, and then the cover pushed down between them to the position shown in Fig. 1, the tension of the springs serving to firmly hold the measuring device to the cover, and so held it is convenient for use when the book is used—for instance, at the time of measuring and recording the measurements of the boards or lumber—and when not desired to use the measuring device it can be detached from the book-cover and placed in the pocket or put away, as desired.

As shown, the springs L M are formed integral with the plate by being struck up from the sheet-plate; but, if desired, the springs can be made separate and attached by rivets or in any suitable manner; but all of one piece of metal is preferable, as it can be made at a much less cost and is much neater; also, only one spring need be used, although it is preferable to use two; also, in lieu of being attached to a book-cover, it can be adapted to be attached to any article desired; also, it can be made of any suitable metal or of wood, ivory, or other material, and can be used to measure the thickness of various articles.

The different notches are marked, as shown, and any number desired can be used and arranged in any suitable manner, and in lieu of notching the arm D it can be in one line and marked off in inches and fractions thereof, the invention not being limited to the particular measuring device nor the measurements herein described and shown.

Having thus described my invention, what I claim is—

1. A device for measuring the thicknesses of boards, lumber, or other material, having suitable measuring notches, spaces, or marks, and provided with a spring or springs for attaching it to the cover of a book or other article.

2. A device for measuring the thicknesses of boards, lumber, or other material, having suitable measuring notches, spaces, or marks, and provided with a spring or springs for attaching it to the cover of a book or other article, and all made of one piece of material.

In testimony whereof I have hereunto set my hand in the presence of two subscribing witnesses.

GEORGE E. DUPEE.

Witnesses:
EDWIN W. BROWN,
PERCY BRYANT.